United States Patent Office 2,804,467
Patented Aug. 27, 1957

2,804,467

PROCESS FOR DEHYDRATING CASTOR OIL

Oliver J. Grummitt, Cleveland, Ohio, assignor to The Sherwin-Williams Company, Cleveland, Ohio, a corporation of Ohio No Drawing. Application July 26, 1951,
Serial No. 238,760

16 Claims. (Cl. 260—405.5)

This invention relates as indicated to a novel method for dehydrating fats or other esters or fatty acids of the ricinoleic series. More particularly, this invention relates to a method for dehydrating castor oil to produce a material having drying properties and therefore useful in the manufacture of varnishes and other such coating compositions.

The dehydration of castor oil to produce drying oils is now a relatively old process. The original German process involved the hydrolysis of castor oil, dehydration of ricinoleic acid by direct distillation, with or without catalyst, followed by esterification of the dehydrated acid with glycerol or other polyalcohols to produce resins or synthetic drying oils. This was succeeded by the more economical process of direct dehydration of the oil. This can be done fairly well by direct heating of the oil, but polymerization is a serious competing reaction. Polymerization may be largely, but not wholly, avoided by the use of catalysts for the dehydration. Since the chemical reaction involved is that of the dehydration of a secondary alcohol group to an olefin, the usual catalysts for such a reaction may be employed. These include various acids, both inorganic and organic, heterogeneous catalysts such as alumina, silica, clays and the like. Sulfuric acid, for example is a very powerful dehydrating catalyst although it must be used cautiously because of the tendency to oxidize and sulfonate and to discolor the product. Neutral catalysts include diethyl sulfate which under the conditions of dehydration, e. g., about 300° C., is believed to decompose to form an acid reacting material.

Under ordinary practice, castor oil is dehydrated by one or another of the numerous processes already available to the art at a point which is remote from the place where such castor oil is converted into paints and varnishes of the modified alkyd or modified drying oil type. Accordingly, it is common practice to dehydrate the oil, cool, package, and ship, then re-heat and compound to produce the ultimate material. It is, therefore, highly desirable that castor oil should be dehydrated directly in the varnish kettle and, without any cooling or segregation of the dehydrated oil, the process of varnish manufacture continued from that point. Obviously, this is considerably more economical than the separate manufacture of dehydrated castor oil.

It is, therefore, a principal object of this invention to provide a process for dehydrating castor oil utilizing a material which not only facilitates the dehydration reaction, but also provides a desirable modifying agent for the castor oil.

Other objects of this invention will appear as the description proceeds.

To the accomplishment of the foregoing and related ends, said invention, then, consists of the means hereinafter fully described and particularly pointed out in the appended claims, the following description setting forth in detail certain illustrative embodiments of the invention, such disclosed means constituting, however, but a few of the various forms in which the principle of this invention may be employed.

It has been found that hydroxylated fats or other esters, e. g., pentaerythritol, sorbitol, ethylene glycol and other such polyhydric alcohol esters, monohydric alcohol esters, e. g., methyl or ethyl ricinoleate, etc., and hydroxy fatty acids of the ricinoleic acid series may be conveniently dehydrated by treating such fat, esters or acids at dehydration temperatures with a maleic treated vegetable or marine glyceride oil of the drying or semi-drying type as the agent by which such hydroxylated fat or hydroxy fatty acid is esterified. The resulting ester is then thermally decomposed, with the result that the final product consists primarily of a mixture of the dehydrated fat or other ester or fatty acid and the drying oil maleic anhydride, or equivalent, adduct. This product may be used directly as a modified drying oil, it may be esterified with glycerol or other such polyhydric alcohol, or other resin components may be added directly to provide certain desirable characteristics to the resulting vehicle. The quantity of maleic condensation product used may be insufficient for complete esterification of the hydroxyl groups in the fat, ester, or fatty acid of the ricinoleic acid series. For example, in a 50–50 mixture of oils (castor oil-maleic-linseed oil condensate) containing 2.5% maleic anhydride, the amount of anhydride is only about ⅓ of that required to esterify all of the castor oil hydroxyl groups.

Broadly stated, therefore, this invention comprises a process for dehydrating esters and fatty acids of the ricinoleic acid series which includes the step of heating together at a temperature of from about 250° C. to about 302° C. for a period of time of from 2.5 hours to about 8.5 hours, a mixture of a material selected from the group consisting of aliphatic alcohol esters of fatty acids of the ricinoleic acid series and fatty acids of the ricinoleic acid series, with the condensation product of an alpha-beta unsaturated aliphatic dibasic acid reacting material with a drying oil, said condensation product containing from about 0.5% to about 35% by weight of said dibasic acid reacting material.

This invention may be illustrated by the following specific examples, which are not, however, to be construed as limitations on the scope of the invention but rather as illustrations of a preferred manner for conducting the reactions contemplated hereby.

EXAMPLE I

In a two-liter three necked flask fitted with a stirrer, thermometer, nitrogen inlet tube, was placed 400 g. of alkali-refined linseed oil. The oil was heated to 225° C. and a slurry of 25 g. maleic anhydride and 75 g. of alkali-refined linseed oil was slowly added. The temperature was raised to 250° C. and held for 15 minutes. A sample removed and tested for uncombined maleic anhydride by washing with water and titrating the water extract with base indicated that the maleic anhydride had been completely reacted. The temperature of the linseed-maleic adduct was raised to 275° C. while 500 g. of No. 2 grade castor oil was added. The oil was held at this temperature for 4½ hours and then at 290° for 4 hours. The course of the reaction was followed by noting the acid number, viscosity, and percent 2-double bond conjugation (ultraviolet spectrophotometric analysis) on samples withdrawn at various time intervals. At the end of one hour at 290° the acid number was 19, viscosity 6 and percent conjugation 3. At the end of 4 hours the acid number was 27, viscosity 68 secs. and percent 2-double bond conjugation 14.5. (The viscosities in this and in subsequent examples are given in Gardner-Holt seconds at 77° F.)

The acid numbers of these various products should be interpreted in the light of the following facts: first, the linseed-maleic anhydride condensation product does not give the calculated acid number in the usual determination. The reason for this is that the solvent used in determining acid numbers is a mixture of benzene and alcohol. This alcohol rapidly half-esterifies the anhydride grouping so that the titration depends only on one carboxyl group. Thus the calculated acid number for a mixture containing 2½% of combined maleic anhydride is 28.6. Titration gives about one-half of this value or 14.6. Secondly, the resulting mixture of dehydrated castor oil and linseed-maleic anhydride may actually have all or part of the anhydride in the acid form. The acid form gives on titration a true acid number. Depending, therefore, on the composition of the mixture, the acid number may range between the calculated and about one-half of the calculated value. The third fact to be considered is that there may be some thermal decomposition of the oils during the dehydration process. Acids formed in this thermal decomposition would be measured as part of the total acid number.

Since this mixture consists of 50% of castor oil (approximately) and since commercially dehydrated castor oil contains approximately 30% 2-double bond conjugation, the fact that this oil mixture contains 14.5% of conjugation indicates that the reaction has gone substantially to completion.

Other properties of this oil mixture are as follows: color (Gardner-Holt) 8, saponification No. 213, gel time at 580° F. 60 minutes, $n_D^{25}$ 1.4887. In drying tests the oil dried-to-touch in 2 hours and in comparison with bodied linseed oil and bodied commercial dehydrated castor oil of about the same viscosity it showed acceptable water, alkali and soap resistance.

The rapid bodying property of these oils is a valuable property. Linseed oil, for example, compared to the oil from Example 1 requires more than 300 minutes to gel as compared to 60 minutes. This value of 60 minutes should also be compared to 40 minutes for a commercial dehydrated castor oil which had an original viscosity of 98 seconds. These gel times indicate that the oil of this invention could be bodied to high viscosity in very short time.

This example illustrates preferred proportions of reactants, i. e., about equal parts of the oil or acid to be dehydrated and the dehydrating-modifying agent.

EXAMPLE II

This oil was prepared from the same reactants as described in Example I but the mixture of linseed-maleic anhydride and castor oil was heated only 1 hour at 275° and then for 3.5 hours at 300°. At the end of this time the oil showed an acid number of 34, a viscosity of 116, and 2-double bond conjugation of 16.6%. The color of the oil was 9, saponification number 210, gel time at 580° F. 55 minutes, and $n_D^{25}$ 1.4888. Drying times in the form of films and resistance of the film were generally satisfactory.

EXAMPLE III

The same reactants as in Example I were allowed to react at 300° C. for 3½ hours. At the end of one hour the product had an acid number of 27, viscosity 16 secs. and 2-double bond conjugation of 15%. At the end of 3½ hours the corresponding constants were 25, 103 and 15.

It is thus apparent from these three examples that the rate of dehydration, as measured by the time required to reach maximum conjugation, is relatively slow at 275° and much faster at 300°. At the higher temperature the rate of viscosity increase due to heat bodying is also greater.

Since water is formed in the dehydration process, it is possible to facilitate the reaction by means of blowing an inert gas through the mixture while heating. Example I was carried out with and without the use of nitrogen gas during the reaction. The increase in rate of dehydration with nitrogen is measurable but not very great. It was concluded that an inert gas was desirable but not necessary.

As usual in oil processing, the color of the product prepared in the presence of nitrogen or other inert gas is somewhat better.

In these three examples the relative concentrations of linseed oil and maleic anhydride in the mixture have been held constant at 50% and 2½% respectively. These concentrations could of course be varied at will depending upon the final product desired. The amount of maleic anhydride combined in the form of an oil adduct is not critical. It is likely, however, that the rate of dehydration depends on this concentration of anhydride. If a linseed maleic adduct containing for example only 1% of maleic anhydride was used it would be preferable to then increase the amount of linseed oil in the mixture above 50%. Conversely, if the amount of combined maleic anhydride with respect to linseed oil was raised above 5% the relative amount of linseed-maleic adduct which could be used might be decreased. In general, amounts of maleic anhydride in the starting mixture of oils should be in the range of .0025% to 31.5%. The oil-maleic adduct is used in amounts ranging from as low as 0.5% to as high as 90%, depending on the type of product desired.

EXAMPLE IV

To show that the presence of maleic anhydride materially increases the rate of dehydration a model experiment was run in which a mixture of equal weights of alkali refined linseed oil and castor oil were heated at 300° C. At the end of 6¼ hours the percent 2-double bond conjugation had reached only 10-11.

EXAMPLE V

To illustrate the use of a concentrated linseed-maleic anhydride compound one was prepared in which the concentration of maleic anhydride was 33%. A mixture of 970 g. of castor oil, 30 g. of this maleic anhydride adduct, which makes the concentration of maleic in the mixture 1%, was heated at 300° for 3½ hours. The final product had an acid number of 25, viscosity 71 secs. and conjugation 18.3%.

EXAMPLE VI

A linseed-fumaric acid product was made by reacting 29.6 g. of fumaric acid with 470.4 g. of linseed oil at 300°. To this was added 500 g. of castor oil, thus making the concentration of fumaric acid approximately 3%. After heating the mixture at 300° for 4½ hours the final product had an acid number of 31, viscosity 95 secs., conjugation 15.3%. This illustrates the fact that fumaric acid may be used instead of maleic anhydride, if combined with a drying oil in an initial step.

EXAMPLE VII

Linseed oil may be replaced as the "carrying agent" for the maleic anhydride or fumaric acid by any other suitable drying or semi-drying oil. In one experiment fumaric acid was combined with sardine oil as described in Example VI and then reacted with castor oil to give a final product of acid number 31, viscosity 129 secs. and conjugation 12%.

EXAMPLE VIII

A detailed study of the dehydration with linseed-maleic in which the amounts of oil were about equal and in which the concentration of maleic anhydride was 2½% was made by removing samples at various time intervals and analyzing each sample as summarized in Table I.

Table I

DEHYDRATION OF CASTOR OIL (750 G.) WITH LINSEED-MALEIC ANHYDRIDE (750 G., 5% MALEIC)

| Sample | Hrs. | Temp., °C.[1] | Visc.,[2] Secs. | Color[3] | A. N. | I. No.[4] | Percent OH | Percent Conj. | $n_D^{20}$ |
|---|---|---|---|---|---|---|---|---|---|
| 1 | 0 | 275 | 3.9 | 6 | 15.2 | 124 | 2.25 | 1.6 | 1.4829 |
| 2 | 1 | 275 | 6.3 | 6 | 17.4 | 124 | 2.10 | 5.3 | 1.4833 |
| 3 | 2 | 300 | 7.2 | 7 | 26.6 | 128 | 1.13 | 15.9 | 1.4855 |
| 4 | 2.25 | 300 | 8.6 | 7 | 27.4 | 126.5 | 0.82 | 17.4 | 1.4867 |
| 5 | 2.5 | 300 | 10.4 | 7 | 28.3 | 123.5 | 0.55 | 17.8 | 1.4873 |
| 6 | 2.75 | 300 | 12.6 | 7 | 28.8 | 120 | 0.46 | 18.1 | 1.4882 |
| 7 | 3 | 300 | 17.0 | 7 | 29.2 | 117.5 | 0.20 | 18.0 | 1.4889 |
| 8 | 3.5 | 300 | 28.0 | 8 | 28.8 | 114 | 0.10 | 16.2 | 1.4894 |

[1] The temperature was manually held within a ±2°.
[2] Gardner-Holt, 77° F.
[3] Gardner color standard.
[4] Wijs, 60 minutes.

The decrease in hydroxyl content with time shows the course of dehydration. At the same time the concentration of 2-double bond conjugation increases. The iodine numbers do not increase regularly because (a) they do not measure total double bonds when those double bonds are in conjugated positions, and (b) near the end of the reaction there is heat bodying of the mixture which consumes double bonds.

It will be observed that in general, these reactions are carried out at a temperature which may range from about 250° C. up to about 302° C., and most usually within the range from about 275° C. to about 300° C. Best results are obtained when the time of reaction is from about 2.5 hours to as much as 8.5 hours, a satisfactory product being obtained anywhere within this range, less time being required at the higher temperatures, i. e., 290° C. and above. The amount of maleic anhydride, maleic acid, or fumaric acid in the addition compound used to effect the dehydration of the hydroxy-containing material may range from 0.5% to 35%. The amount of anhydride or acid in the entire reaction mass may range from 0.0025% to about 31.5%. The concentration of hydroxy fat, other aliphatic alcohol ester, or fatty acid of the ricinoleic acid series in the reaction mixture may range from about 10% to as high as 99.5%. I am not certain of the mechanism by which this reaction occurs and accordingly, do not wish to be limited by the following discussion. The exact nature of the drying oil-maleic anhydride, maleic acid, or fumaric acid compound is not known. It seems very probable, however, that the double bond of the dibasic acid or anhydride has been used in the formation of the addition compound. Whether this addition has occurred at a double bond in the drying oil or at an active methylene group in the drying oil-fatty acid radical is likewise not certain. It is believed, however, that the methylene group is involved, thus yielding a substituted succinic acid or succinic acid anhydride. When this material is added to castor oil or other such member of the ricinoleic acid series, the hydroxyl groups of the ricinoleic acid radicals probably react with the anhydride grouping to form the half ester, that is, the acid ester of the succinic acid anhydride-drying oil condensation product. This is in conformity with the known property of maleic anhydride of reacting readily with alcohols to form acid-esters. On further heating, this half ester may be esterified or decompose to form a new double bond in the ricinoleic acid residue and a linseed-maleic acid compound. This acid addition compound is then available for esterification with additional alcoholic hydroxyl groups or it may be dehydrated to form the anhydride which is in turn again available to esterify additional ricinoleic hydroxyl groups. Thus, the maleic acid or anhydride compound is regenerated in the course of the reaction and is available for repeated use until the dehydration is complete. In the foregoing examples where the concentration of maleic anhydride in the starting material is in the neighborhood of 2.5%, this represents actually about ⅓ of the quantity of anhydride which is required to esterify all of the castor oil hydroxyl groups. It should also be pointed out that any drying oil-maleic anhydride adduct which is hydrolyzed to the acid form may very likely exert some catalytic effect on the dehydration by virtue of its acid character. However, since the maleic acid compound is a typically weak organic acid, the magnitude of this catalytic effect must be quite small.

The foregoing examples have illustrated the use of linseed oil and sardine oil for formation of the dibasic acid condensation product. Other drying oils such as soya bean oil, sunflower seed oil, safflower, perilla, tung and the like, particularly the non-conjugated drying oils and semi-drying oils, may be used in the manner illustrated by said examples. As indicated, conjugated oils may be used to compound the dehydrating agents in accordance with this invention. However, the resulting products are not of particular utility in the coating composition field and for this reason as well as others, it is preferred to employ non-conjugated drying and semi-drying oils which are in effect upgraded by admixture with dehydrated castor oil. Dehydrated castor oil may also be employed to make the dehydrating agents of this invention, but again it is more desirable to up-grade inferior oils. Although I prefer to use maleic anhydride as the condensing agent with such oils, as has been indicated above, maleic acid and fumaric acid may also be employed, as well as other alpha, beta-unsaturated dibasic acids. Under the conditions of the reaction, the maleic acid condensation product may dehydrate to form the anhydride and the fumaric acid condensation product may re-arrange and dehydrate to form the maleic anhydride product.

Hydroxyl-containing esters and acids of the ricinoleic acid series include castor oil, ricinoleic acid, chlor-ricinoleic acid, castor oil monoglyceride, castor oil diglyceride, methyl ricinoleate, ethylene glycol diricinoleate, etc.

Other modes of applying the principle of this invention may be employed instead of those specifically set forth above, changes being made as regards the details herein disclosed, provided the elements set forth in any of the following claims, or the equivalent of such be employed.

I, therefore, particularly point out and distinctly claim as my invention:

1. A process for dehydrating esters and fatty acids of the ricinoleic acid series which includes the step of heating together at a temperature of from about 250° C. to about 302° C. for a period of time of from 2.5 hours to about 8.5 hours, a mixture of a material selected from the group consisting of aliphatic alcohol esters of fatty acids of the ricinoleic acid series and fatty acids of the ricinoleic acid series, with the condensation product of an alpha-beta unsaturated aliphatic dibasic acid reacting material with a drying oil, said condensation product containing from about 0.5% to about 35% by weight of said dibasic acid reacting material, simultaneously decomposing any ricinoleate-maleic adduct ester formed in the reaction, and recovering a mixture of dehydrated ricinoleate material and drying oil-dibasic acid adduct.

2. A process for dehydrating esters and fatty acids of the ricinoleic acid series which includes the step of heating together at a temperature of from about 250° C. to about 302° C. for a period of time of from 2.5 to about 8.5 hours a mixture of from 99.5 parts to about 10 parts of a material selected from the group consisting of aliphatic alcohol esters of fatty acids of the ricinoleic acid series and fatty acids of the ricinoleic acid series, with from 0.5 to about 90 parts of the condensation product of an alpha-beta unsaturated aliphatic dibasic acid reacting material and a drying oil, said condensation product containing from about 0.5% to about 35% by weight of said dibasic acid reacting material, simultaneously decomposing any ricinoleate-maleic adduct ester formed in the reaction, and recovering a mixture of dehydrated ricinoleate material and drying oil-dibasic acid adduct.

3. A process in accordance with claim 1 in which the ester of the ricinoleic acid series is castor oil.

4. A process in accordance with claim 1 in which the fatty acid of the ricinoleic acid series is ricinoleic acid.

5. A process in accordance with claim 1 in which the drying oil is a non-conjugated drying oil.

6. A process in accordance with claim 1 in which the drying oil is a non-conjugated vegetable drying oil.

7. A process in accordance with claim 1 in which the drying oil is linseed oil.

8. A process in accordance with claim 1 in which the drying oil is alkali refined linseed oil.

9. A process in accordance with claim 1 in which the drying oil is soyabean oil.

10. A process in accordance with claim 1 in which the drying oil is sardine oil.

11. A process in accordance with claim 1 in which the dibasic acid reacting material is maleic anhydride.

12. A process in accordance with claim 1 in which the dibasic acid reacting material is fumaric acid.

13. A process in accordance with claim 1 in which the dibasic acid reacting material is maleic anhydride and is present in the condensation product to the extent of about 5% by weight.

14. A process in accordance with claim 1 in which the drying oil is alkali refined linseed oil and the dibasic acid reacting material is maleic anhydride.

15. A process in accordance with claim 1 in which the condensation product is produced from 95 parts of alkali refined linseed oil and 5 parts of maleic anhydride.

16. A process of dehydrating castor oil which comprises the steps of heating together at a temperature of from 275° C. to 302° C. for a period of about 4.5 hours castor oil and about an equal amount of a linseed oil-maleic anhydride condensation product containing about 5% maleic anhydride, simultaneously decomposing any castor oil-maleic adduct ester formed in the reaction, and recovering a mixture of dehydrated castor oil and linseed oil-maleic adduct.

References Cited in the file of this patent

UNITED STATES PATENTS

| | | |
|---|---|---|
| 2,394,742 | Bent et al. | Feb. 12, 1946 |
| 2,488,999 | Ullmann | Nov. 22, 1949 |